(12) United States Patent
Chern et al.

(10) Patent No.: US 9,857,569 B2
(45) Date of Patent: Jan. 2, 2018

(54) COMBINED LENS MODULE AND IMAGE CAPTURING-AND-SENSING ASSEMBLY

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: EVERREADY PRECISION IND. CORP., Kaohsiung (TW)

( * ) Notice: Subject to any disclaimer, the term of this patent is extended or adjusted under 35 U.S.C. 154(b) by 362 days.

(21) Appl. No.: 14/595,697

(22) Filed: Jan. 13, 2015

(65) Prior Publication Data

US 2016/0124180 A1 May 5, 2016

(30) Foreign Application Priority Data

Oct. 31, 2014 (TW) .............................. 103137853 A
Oct. 31, 2014 (TW) .............................. 103219362 A

(51) Int. Cl.
*G02B 9/60* (2006.01)
*G02B 13/00* (2006.01)
*H04N 5/225* (2006.01)
*G02B 13/16* (2006.01)
*H04N 5/33* (2006.01)
*G02B 9/12* (2006.01)

(52) U.S. Cl.
CPC ....... *G02B 13/008* (2013.01); *G02B 13/0035* (2013.01); *G02B 13/16* (2013.01); *H04N 5/2254* (2013.01); *H04N 5/332* (2013.01); *G02B 9/12* (2013.01)

(58) Field of Classification Search
CPC .. G02B 13/008; G02B 13/0035; G02B 13/16; G02B 9/12; H04N 5/332; H04N 5/2254
See application file for complete search history.

(56) References Cited

U.S. PATENT DOCUMENTS

| 5,329,401 | A  | * | 7/1994 | Sato ..................... G02B 15/177 359/684 |
| 5,673,143 | A  | * | 9/1997 | Chin ....................... G02B 23/12 250/368 |
| 5,737,119 | A  | * | 4/1998 | Mladjan ................. G02B 15/02 250/330 |
| 6,845,326 | B1 | * | 1/2005 | Panigrahi .................. G01J 3/02 250/339.02 |
| 7,072,096 | B2 | * | 7/2006 | Holman .................... F21S 8/08 257/E25.02 |
| 7,199,348 | B2 | * | 4/2007 | Olsen ................ H01L 31/02325 250/208.1 |

(Continued)

*Primary Examiner* — Sath V Perungavoor
*Assistant Examiner* — Philip Dang
(74) *Attorney, Agent, or Firm* — Muncy, Geissler, Olds & Lowe, P.C.

(57) ABSTRACT

A combined lens module including plural lens modules deposited within a housing is provided. These lens modules include plural lenses and multiple apertures. Each lens has a main lens element for visible light and an associate lens element for invisible light. An image capturing-and-sensing assembly may be performed by equipping with such a combined lens module and a sensor for visible light and invisible light, which could have high-resolution and apply to a thin portable device or any environment in use of infrared structured lighting or light scanner for the applications of human-machine interactive.

18 Claims, 4 Drawing Sheets

(56) References Cited

U.S. PATENT DOCUMENTS

| | | | | |
|---|---|---|---|---|
| 7,396,126 B2* | 7/2008 | Blum | ................... | G02B 27/017 351/159.39 |
| 7,496,293 B2* | 2/2009 | Shamir | ................... | G03B 7/08 348/216.1 |
| 7,517,083 B2* | 4/2009 | Blum | ................... | G02B 27/017 351/159.44 |
| 7,566,855 B2* | 7/2009 | Olsen | ...................... | G02B 7/04 250/208.1 |
| 7,830,619 B2* | 11/2010 | Do | ........................ | G02B 7/008 359/741 |
| 8,331,041 B2* | 12/2012 | Katakura | ............... | G02B 13/06 359/751 |
| 8,514,477 B2* | 8/2013 | Zhang | ...................... | G02F 1/11 359/287 |
| 8,659,839 B2* | 2/2014 | Matsui | ............... | G02B 13/0035 348/360 |
| 2006/0244907 A1* | 11/2006 | Simmons | ............... | G02B 27/46 351/159.26 |
| 2008/0106633 A1* | 5/2008 | Blum | ...................... | G02C 7/08 348/345 |
| 2012/0218648 A1* | 8/2012 | Lin | ................... | G02B 13/0085 359/715 |
| 2013/0228675 A1* | 9/2013 | Chen | ...................... | G01N 21/01 250/227.11 |
| 2014/0055659 A1* | 2/2014 | Iwamoto | ................ | G02B 15/14 348/335 |
| 2014/0078376 A1* | 3/2014 | Shuster | .................. | G01B 11/22 348/348 |

* cited by examiner

COMBINED LENS MODULE AND IMAGE CAPTURING-AND-SENSING ASSEMBLY

FIELD OF THE INVENTION

The present invention relates to the field of combined lens module, and especially relates to the combined lens module applied to slim opto-electronic device and image-capturing device, module, or apparatus.

BACKGROUND OF THE INVENTION

In current field of emergent technology and technical applications, dramatic attention has been put on human mutual interactive via different machines and hence, a variety of platforms, either with simple wear device or through wireless communication, have been developed to improve the quality of human daily life and health. Indeed, the interactive is no more limited to common input-output devices (IOD). The evolution of input device was changed from real keyboard to touch panel, and then to gesture control smartly. On the other hand, the typical output device is monitor, liquid crystal display, and then touch panel, which is also an input device as mentioned. It is not a surprise that the input and output can be virtually interacted eventually. Of course, not the less to mention, the IOD with eye as well as the other human activity, say voice and body motion, are no more uncommon in real world. Indeed, in current days, mobile device, e.g., smart phone, has been widely used and new functions are embedded as driven by the demands of market and the consumers. Because the central role played by mobile devices is actually to extend the capability of input-output connectivity for human, it is expecting that gesture control will be fully implemented in our circumstance and environment.

In many applications of gesture control, infrared structured lighting is used. The main advantage of infrared light is its nature of non-visible characteristics and hence it will not interfere the activity of human, particularly for eyes, and the associated connectivity. Meanwhile, the inclusion of infrared wavelength for transmitters and receivers can enhance signal-to-noise in sensing and detecting for many circumstances. The use of structured lighting in different wavelength bands, even for thermal range, is also considering to be an effective means in applications.

As viewing of the demand of imaging apparatus, one will need to have the typical high-resolution camera module for common visual application while IR imaging camera module, even for thermal imaging, has to be included. Therefore, there is a need to integrate all imaging apparatuses in one single device. Accordingly, it is an important issue to develop an image-capturing module of multiple functions in a compact size for the smart mobile phone equipped with the generation of structured lighting.

SUMMARY OF THE INVENTION

To meet the requirements aforementioned, a combined lens module is provided herein. The combined lens module includes a plurality of lenses, and each of the lenses has one or more lens elements to add the field of view for the combined lens module.

To meet the requirements aforementioned, a combined lens module and an image capturing-and-sensing assembly equipped therewith are provided herein. The combined lens module includes the plural lenses, and each of the lenses includes the lens elements for passing invisible light and visible light, respectively. The combined lens module can be equipped with a sensor capable of sensing the infrared light and the visible light simultaneously. Thus the combined lens module may receive the light data of the outside visible light and the outside invisible light, such as infrared light or thermal light.

To meet the requirements aforementioned, a combined lens module and the image capturing-and-sensing assembly equipped therewith are provided herein. The combined lens module includes a housing accommodating the plural lenses, and the housing has a compact size to fit into a thin mobile device or apparatus.

In accordance with an aspect of the present invention, a combined lens module includes: a housing; and a plurality of lens modules deposited within the housing, the lens modules including a plurality of lenses and having a plurality of apertures, wherein each of the lens includes a main lens element for passing visible light and an associate lens element for passing invisible light, and light data from the outside of the housing reaches the housing and passes through the lens modules.

In an embodiment, the main lens element is in the center zone of the corresponding lens, and the associate lens element is at the surrounding zone of the corresponding lens.

In an embodiment, the lenses include three lenses stacked on one another within the housing, and the combined lens module further includes an aperture stop.

In an embodiment, the main lens element includes a first main lens element of a first lens, a second main lens element of a second lens, and a third main lens element of a third lens, and the aperture stop is placed between the first main lens element and the second lens element, and wherein the visible light from the outside of the housing passes through the first main lens element, the aperture stop, the second main lens element and the third main lens element in sequence, and then reaches a sensor, and the optical power of the third main lens element is positive.

In an embodiment, the optical powers of the first main lens element and the second main lens element are positive numbers.

In an embodiment, the main lens element includes a first main lens element of a first lens, a second main lens element of a second lens, and a third main lens element of a third lens, and the aperture stop is placed between the first main lens element and the housing, and wherein the visible light from the outside of the housing passes through the aperture stop, the first main lens element, the second main lens element and the third main lens element in sequence, and then reaches an image sensor, and the optical power of the third main lens element is positive.

In an embodiment, the optical power of the first main lens element is positive, and the optical power of the second main lens element is negative.

In an embodiment, the apertures includes a main aperture corresponding to the plural main lens elements, and an associate aperture corresponding to the plural associate lens, and wherein the image circle of the associate aperture and the image circle of the main aperture have at least a portion to overlap with each other.

In an embodiment, the invisible light includes at least one of infrared light and thermal light.

In accordance with another aspect of the present invention, an image capturing-and-sensing assembly includes: a housing; a plurality of lens module deposited within the housing, the lens modules comprising a plurality of lenses and having a plurality of apertures, wherein the plural apertures comprise a main aperture imaging visible light from the outside of the housing to pass through and an associate aperture imaging invisible light from the outside of the housing to pass through; and a sensor sensing the visible light passing through the main aperture and the invisible light passing through the associate aperture.

In an embodiment, the sensor includes a non-Bayer sensor in which at least one sensing pixel for the invisible light is included in one unit, where the corresponding sensor unit may be in a regular matrix or in an irregular shape.

In an embodiment, the sensor includes sensors for thermal detection.

In an embodiment, each of the lenses includes a plurality of lens elements, and the lens elements include a main lens element at the center of the corresponding lens to be stacked on another main lens elements of the another lenses to form the main aperture, and an associate lens element at the surrounding of the center of the corresponding lens to be stacked on another associate lens elements of the another lenses to form the associate aperture.

In an embodiment, the image capturing-and-sensing assembly further comprising an aperture stop, and wherein the main lens elements comprise a first main lens element, a second main lens element, and a third main lens element, and wherein the aperture stop is between the first main lens element and the second main lens element, or the aperture stop is between the first main lens element or the housing.

In an embodiment, the optical powers of the first main lens element and the second main lens element are positive numbers.

In an embodiment, the sensor includes sensors for thermal detection.

From the above descriptions, the present invention provides a combined lens module including plural lens modules deposited within a housing. These lens modules include plural lenses and multiple apertures. Each lens has a main lens element for visible light and an associate lens element for invisible light, such as infrared light or light where thermal bands can also be included. An image capturing-and-sensing assembly may be performed by equipping with such a combined lens module and a sensor for visible light and invisible light, which could have high-resolution and apply to a thin portable device or any environment in use of infrared-red structured lighting or light scanner for human interaction field.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

In the present invention, a lens assembly may have plural apertures, and each of the apertures can have it own lens module. Each of the lens modules can include one or more lens elements. The plural lens elements may be stacked along the optical axes of the lens modules. That is, the distances from an objective plane or an image plane to these lens elements are different. Furthermore, the lens elements corresponding to the different lens modules may be separated into the plural lenses or integrated into a single piece lens, for example, in the way of the plastic molding to integrate the plural lens elements into a single piece. The different lens elements on a single piece lens may have their own functions and be illustrated in the following paragraphs.

Figure 1:
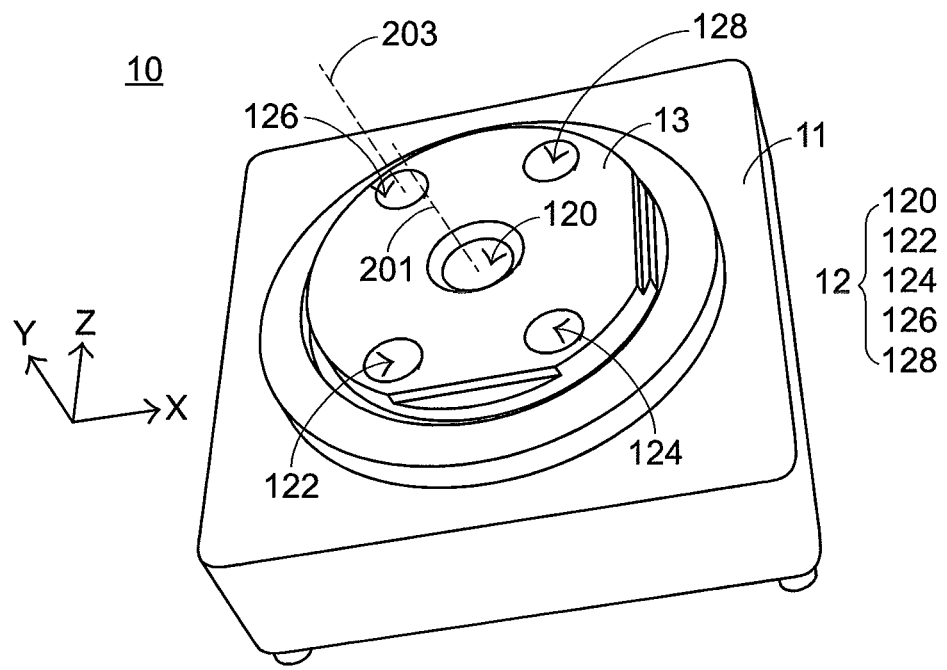
FIG. 1 is a schematic stereo diagram illustrating a combined lens module according to an embodiment of the present invention.

FIG. 1 is a schematic stereo diagram illustrating a combined lens module. Please refer to FIG. 1, a combined lens module 10 includes a base 11, a housing 13 deposited in the base 11, and a lens assembly 12 deposited in the housing 13. In this embodiment, the base 11 accommodates and fixes the housing 13 having the lens assembly 12. Besides, the base 11 may include other structures to fix other circuit or other assembled components. In practice, the base 11 may be omitted if necessary. Next, the housing 13 is configured to integrate the lens assembly 12 to become a single member. For example, the housing 13 could include a top plate, a bottom plate, and a sidewall to fix the lens assembly 12. It is understood that the ratio, the positions, the sizes, the geometric shapes of the base 11 and the housing 13 in FIG. 1 are just exemplary for illustration, not limited to a design in the present invention.

Next, the lens assembly 12 includes a multitude of lens modules, such as a first lens module 120, a second lens module 122, a third lens module 124, a fourth lens module 126, and a fifth lens module 128. In this embodiment, the first lens module 120 is positioned in the center zone of the housing 13, and surrounded by the second lens module 122, the third lens module 124, the fourth lens module 126, and the fifth lens module 128. It is noted that the arrangement of these lens modules can be regular or irregular, and a regular or symmetric arrangement is preferred. The arrangement shown in FIG. 1 does not limit any design of the present invention. Furthermore, the lens assembly 12 has a plurality of apertures corresponded by the lens modules aforementioned. For convenient illustration, the first lens module 120 implements a main aperture with a main optical axis 201, while the second lens module 122, the third lens module 124, the fourth lens module 126, and the fifth lens module 128 implement different associate apertures with associated optical axes 203. In the embodiment, the first lens module 120 of the main aperture is configured to permit visible light data detective by a visible light sensor to pass through. The other lens modules of the associate apertures are configured to permit invisible light data detective by an invisible light sensor to pass through, such as the wavelength of 830 nm or 920 nm which less appeared in our natural environment. Furthermore, though the first lens module 120 is illustrated to implement the capturing of the visible light data, it is not limited to a single first lens module 120 at design, and the plural lens modules 120 distributed in the center zone of the housing 13 may be designed to be capable of permitting the visible light data to pass through. Moreover, the invisible light aforementioned may include, but not limited, infrared light, thermal light (long-wavelength infrared light), or the combination thereof.

Figure 2:
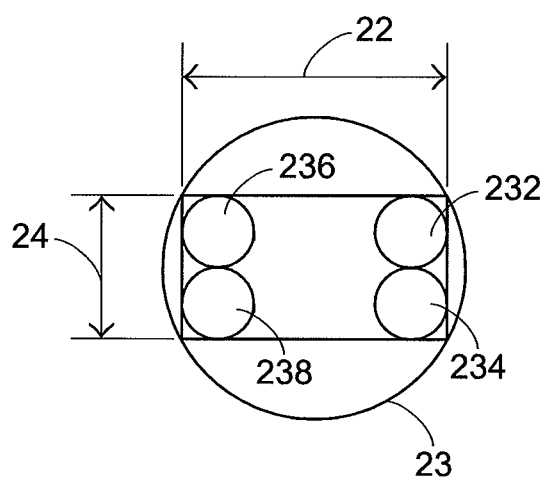
FIG. 2 is a schematic diagram illustrating an exemplary image circles map of an associate aperture according to the embodiment of the present invention.
Figure 3:
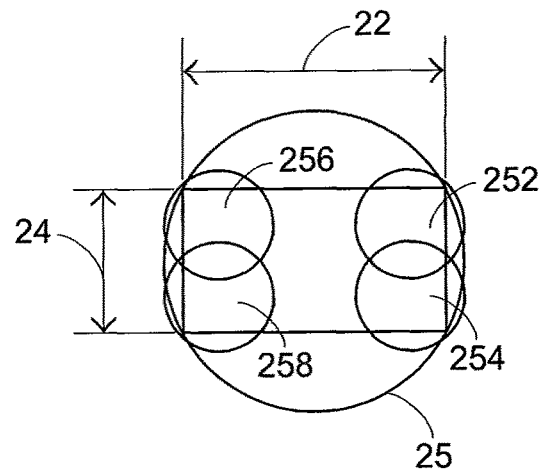
FIG. 3 is a schematic diagram illustrating another exemplary image circles map of an associate aperture according to the embodiment of the present invention.

FIG. 2 and FIG. 3 are schematic diagrams illustrating the different exemplary image circles maps of the associate apertures for the different arrangements on the lens modules in the present invention. Take a typical 4 MP sensor with a format 16:9 as an example, it is denoted by a square of the length 22 of 5.376 mm and the width 24 of 3.040 mm. To use the maximum capability of imaging for the sensor, image circles 23 and 25 have to be at least 6.176 mm diameter. Accordingly, shown in FIG. 2, associate apertures 232, 234, 236, and 238 are designed to be separated without overlapping within the image circle 23 and within the range of the length 22 and the width 24 of the sensor. Shown in FIG. 3, associate apertures 252, 254, 256, and 258 are designed to be independent with partially overlapping portions within the image circle 23 and cover some portions over the range of the length 22 and the width 24 of the sensor. Accordingly, the cooperation of the main aperture and the one or more associate apertures in the present invention can satisfy to cover the image circle of the maximum capability of imaging for the sensor in use. The ranges of the main aperture and the associate apertures can be separated without overlapping, or independent with partially overlapping portions. The arrangements of the main aperture and the associate apertures are not limited to in symmetric or asymmetric form, or identical or different sizes of apertures. Furthermore, the main aperture and the associate apertures in the present invention can include multitudes of different directions of viewing (sighting) and hence the lens assembly of the present invention can be named as a multiple view lens assembly, and the characteristics of each aperture are specified by the corresponding field of view (FOV) or field angle (FA) and the size of aperture.

Figure 4:
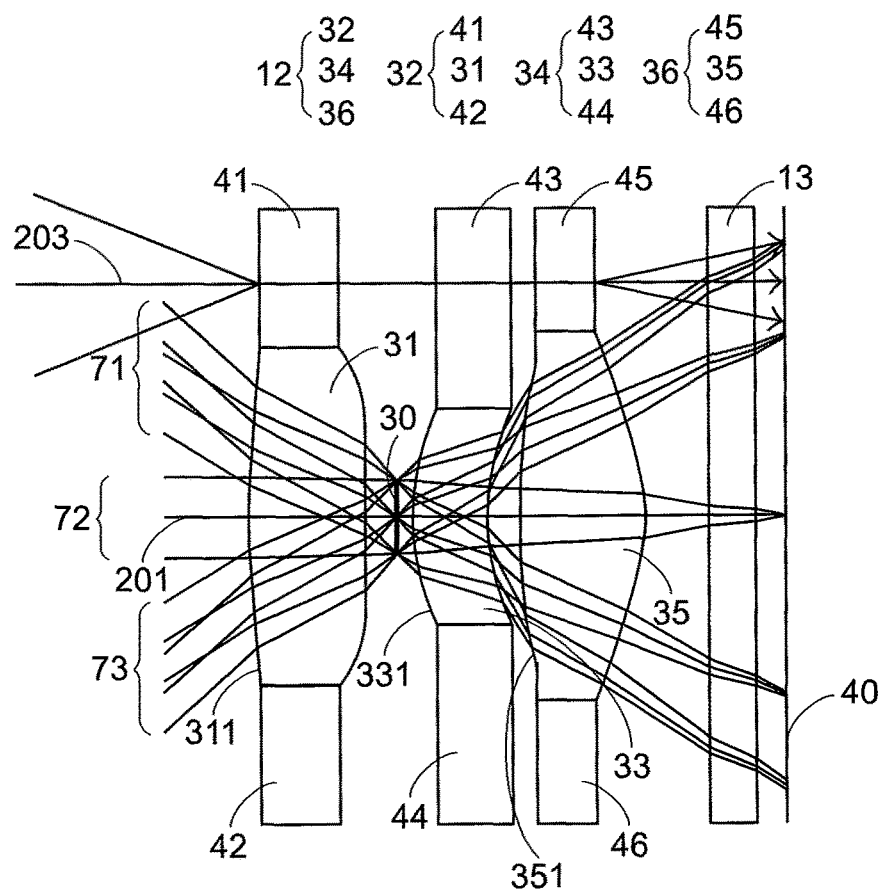
FIG. 4 is a schematic cross-view diagram illustrating the combined lens assembly of a first embodiment and other components according to the embodiment of the present invention.
Figure 5:
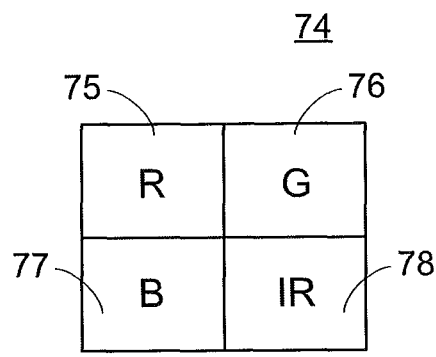
FIG. 5 is a schematic diagram illustrating a sensing unit of an exemplary sensor according to the embodiment of the present invention.

FIG. 4 is a schematic cross-view diagram illustrating the combined lens assembly of a first embodiment and other components, and FIG. 5 is a schematic diagram illustrating a sensing unit of an exemplary sensor. Please refer to FIG. 1 and FIG. 4, the lens assembly includes three lenses 32, 34, and 36, and each of the lenses 32, 34, and 36 includes one or more lens elements. In the first embodiment, the lens 32 includes a first main lens element 31, and a first associate lens element 41 and a second associate lens element 42 deposited around the first main lens element 31. Similarly, the lens 34 includes a second main lens element 33, and a third associate lens element 43 and a fourth associate lens element 44 deposited around the second main lens element 33. The lens 36 has a third main lens element 35, and a fifth associate lens element 45 and a sixth associate lens element 46 deposited around the third main lens element 35. Moreover, the associate lens elements can be separated with one another, or be within a continuous zone if they belong to the same lens. Next, compared with FIG. 1, the first lens module 120 includes the first main lens element 31, the second main lens element 33, and the third main lens element 35. The third lens module 124 has the second associate lens element 42, the fourth associate lens element 44, and the sixth associate lens element 46. The fourth lens module 126 has the first associate lens element 41, the third associate lens element 43, and the fifth associate lens element 45. It is understood that the second lens module 122 and the fifth lens module 128 are not shown in FIG. 4 because of selecting a specific cross-view diagram. Furthermore, the lens 34 is deposited between the lens 32 and the lens 36. The first face 311 of the lens 32 is faced towards an objective plane, the first face 331 of the lens 34 is faced towards the objective plane and the lens 32. The first face 351 of the lens 36 is faced towards the objective plane, the lens 32, and the lens 34. Besides, an aperture stop 30 is placed in front of the first face 331 of the second main lens element 33, and a sensor 40 is set behind the lens 36.

Please refer to FIG. 1 and FIG. 4 again, in the first embodiment, the lens configuration of the first lens module 120 is represented by a text "XAXP", in which "X" represents the optical power (OP) for the lens counting from the objective plane, and can be positive or negative; "A" represents the aperture stop 30; "P" represents the positive optical power for the second lens counting from the objective plane; and "N" represents the negative optical power of the face of the lens counting from the objective plane. Accordingly, the optical power of the first main lens element 31 is a positive number near to zero, a positive number of 0.1038 is preferred such that the corresponding field of view could be extended nearly close to about 80-90 degrees, or even larger. Next, the optical powers of the second main lens element 33 and the third main lens element 35 are positive numbers respectively more than the one of the first main lens element 31, the preferred positive numbers of the second main lens element 33 and the third main lens element 35 are 0.1497 and 0.7552, respectively. However, these numbers aforementioned are not limited in the present invention. The lens configuration of the first lens module 120 is considered to be capable of providing enough space to let multitudes of light beams for associate views reach the sensor 40 behind the lens assembly without interferences among one another, after the multitudes of light beams pass through the first lens module and other surrounding lens modules. Accordingly, the lens configuration of the first lens module 120 could have a positive optical power of the lens that is the closest to the sensor 40. If the aperture stop 30 is necessary, it would be placed after the lens element that is the closest to the objective plane.

Please refer to FIG. 1 and FIG. 4 again, for example, a person stands ahead of the lens assembly and stretches his arms from his shoulders (not shown in FIG. 4). Light data 72 of the person's body in right front of the lens assembly 12 enters into the lens assembly 12 in the way of the incident direction parallel to a main optical axis 201. Light data 71 of the stretched left arm and light data 73 of the stretched right arm pass through the lens assembly 12 and then reach the sensor 40 in the way of the respectively incident angles with respect to the main optical axis 201. These incident angles results from these incident directions are not parallel to the main optical axis 201. However, the first lens module 120 can provide the enough space to let the light data 71 and the light data 73 reach and be received by the sensor 40 without the interferences with each other.

Furthermore, the combined lens modules of the present invention are equipped with the sensor 40 to become an image-capturing assembly. The combined lens modules of the present invention are capable to permit the visible light and invisible light (eg. the infrared light, or thermal light) from the outside of the housing to pass through the lens modules and then reach the sensor 40 (in FIG. 4 and FIG. 5), so that the sensor 40 could be considered to be a non-Bayer sensor, i.e., the pixels are distributed for Red (R), Green (G), Blue (B), IR (infrared or invisible) regularly or irregularly, or say, in which at least one sensing pixel for the invisible light is included in one unit, where the corresponding sensor unit may be in a regular matrix or in an irregular shape, and it can sense both the visible light and the invisible (infrared or thermal for example) light. Please refer to FIG. 4 and FIG. 5, the sensor 40 includes a plurality of sensing pixels 74 aligned in a matrix of one or two dimensions. Each of the sensing pixels 74 could have four pixel units 75, 76, 77, and 78. For example, the pixel unit 75 is configured to sense red light (R), the pixel unit 76 is configured to sense green light (G), the pixel unit 77 senses blue light (B), and the pixel unit 78 is configured to sense infrared light or other invisible light. Accordingly, the pixel units 75, 76, and 77 of the sensing pixel 74 are the portions of a visible light domain on the sensor 40, while the pixel unit 78 is the portion of a infrared light domain on the sensor 40.

Consequently, the visible light data passing through the main lens elements reaches the visible light domain of the non-Bayer sensor, while the infrared or invisible light data passing through the associate lens elements reaches the infrared (invisible) light domain of the non-Bayer sensor. Thus, a single sensor may be used for the combined lens module in the present invention and simplify the members of an image-capturing assembly. Of course, it is understood that two or more individual sensors may also used in the present invention, such as a Bayer sensor in charge of receiving the visible light data and other specific sensor in charge of receiving the infrared light data and other invisible light data.

Furthermore, the image circle of the lens configuration in FIG. 4 can be similar to the one in FIG. 3, the image circle 25 represents the one of the first lens module 120, which follows the lens configuration of "XAXP" rule and enables the image circles of all the associate lens modules to be within the domain of the image circle of the first lens module 120. Besides, the lenses of the first lens module may be designed in a more freedom way and a larger resolution capability.

Figure 6:
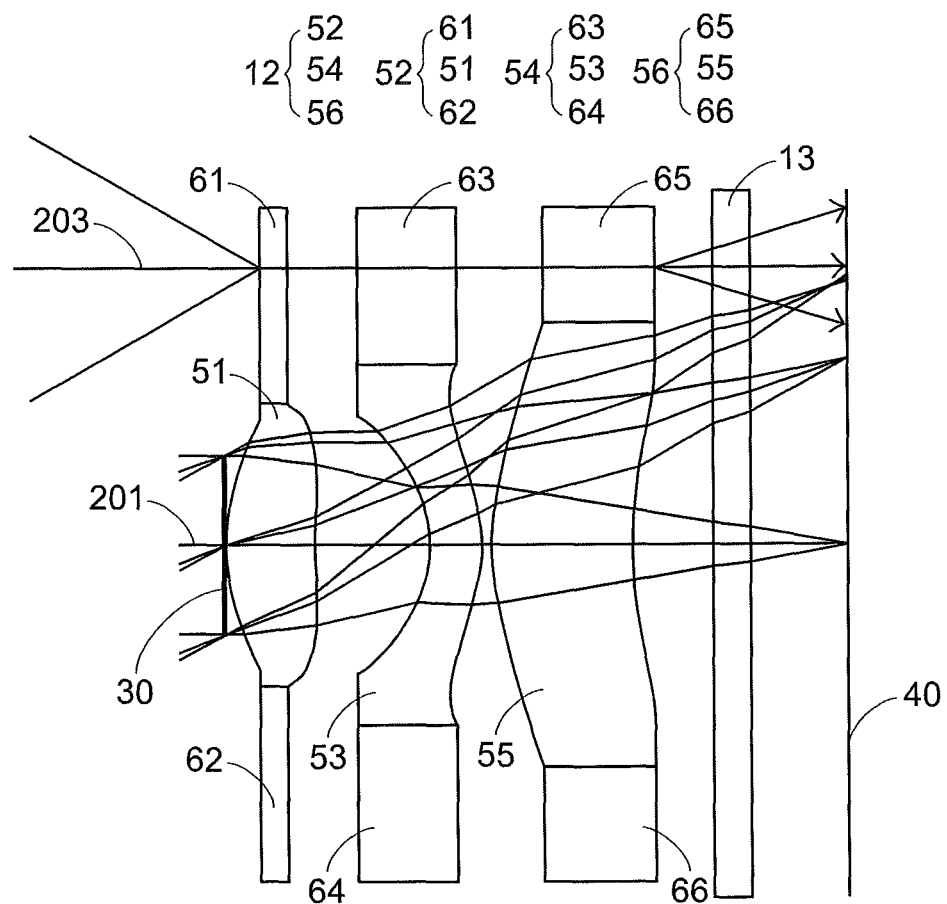
FIG. 6 is a schematic cross-view diagram illustrating the combined lens assembly of a second embodiment and other components according to the embodiment of the present invention.

FIG. 6 is a schematic cross-view diagram illustrating the combined lens assembly of a second embodiment and other components. Please refer to FIG. 1 and FIG. 6, the lens assembly 12 includes three lenses 52, 54, and 56. The lens 52 includes a first main lens element 51, and a first associate lens element 61 and a second lens element 62 deposited around the first main lens element 51. Similarly, the lens 54 has a second main lens element 53, and a third associate lens element 63 and a fourth associate lens element 64 deposited around the second main lens element 53. The lens 56 includes a third main lens element 55, and a fifth associate lens element 65 and a sixth associate lens element 66 deposited around the third main lens element 55. Next, the lens 54 is positioned between the lens 52 and the lens 56. The aperture stop 30 is placed in front of the lens 52 that is the closest to the objective plane, or say, the aperture stop 30 is place in front of all the lens elements. Thus, the first lens module 120 has the lens configuration of "AXXP". Besides, the sensor 40 is positioned behind the lens 56. It is noted that the light data in FIG. 6 is similar to the ones shown in FIG. 4, and some of them omitted in FIG. 6 are not limited to the second embodiment.

Compared with the first embodiment, the aperture stop 30 of the second embodiment is located at the position the closest to the objective plane, and the third main lens element 55 of the lens 56 that is just in front of the sensor has a positive optical power. The optical power of the third main lens element 55 is preferred 0.6924. The first main lens element 51 of the lens 52 and the second main lens element 53 of the lens 54 have positive or negative numbers, respectively. For example, the optical power of the first main lens element 51 has a preferred positive number of 3.964, while the optical power of the second main lens element 53 has a preferred negative number of −0.789, but not limited to in the present invention.

Figure 7:
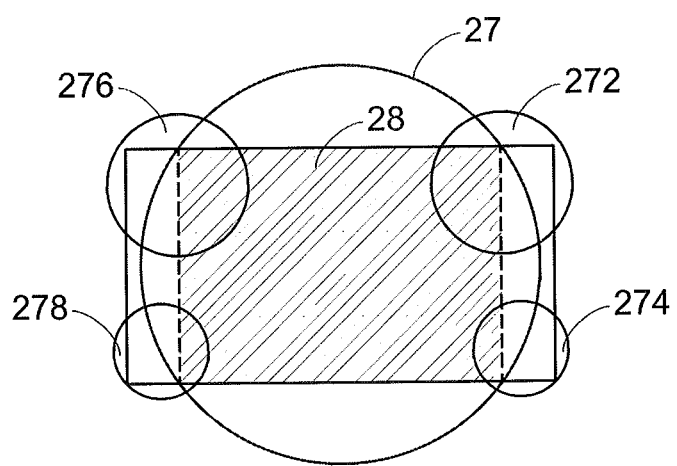
FIG. 7 is a schematic diagram illustrating the image circle of FIG. 6 according to the embodiment of the present invention.

FIG. 7 is a schematic diagram illustrating the image circle of FIG. 6. Please refer to FIG. 1, FIG. 6, and FIG. 7, image circle 27 is the one of the first lens module 120 (main lens module), and image circles 272, 274, 276, and 278 are the ones of the associate lens modules. Furthermore, the image circles 272, 274, 276, and 278 are partially overlapped with the image circle 27, and an image-capturing domain 28 is within the ranges of all the image circles aforementioned.

Accordingly, the lens module of the present invention combines multitudes of lenses, and each of the lenses can have different lens elements in charge of the visible light data and the infrared light data, respectively. Compared with a single lens, such a combined lens is used to improve the field of view and further enhance the image quality of an associate field of view. Next, the lens element in charge of passing the visible light data could be positioned in the center zones of any lens, and the lens element in charge of passing the infrared light data could be at the surrounding of the corresponding lens. From the view of mechanical enhancement in practice, the lens elements for the infrared light data are the extensions of the lens elements for the visible light data, which could improve the mechanical strength of the lenses and permit the invisible light data (infrared light data or thermal light data) to reach the sensor behind the lens modules, so that both mechanical and optical properties are considered in the combined lens modules. Besides, because any lens has different lens elements in charge of passing the invisible light data (infrared light data or thermal light data for example) and the visible light data, respectively, the combined lens modules of the present invention can be applied to an image-capturing device or apparatus with multiple apertures. Moreover, the multitudes of lenses are accommodated within the single housing to reduce the whole size, so such a combined lens module is suitable applied to a slim smart mobile phone. Next, the combined lens module of the present invention is capable to receive both the visible light data and the invisible light data in which infrared light is also included, so it is applied to a situation or environment in use of the invisible light for detection, scanning, or other purposes, such as an interactive device or apparatus with human body. The invisible light may be in thermal range, too.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A combined lens module comprising:
   a housing; and
   a plurality of lenses deposited within the housing and stacked on one another, each of the lenses comprising a main lens element for passing visible light at the center zone of the corresponding lens and a plurality of associate lens elements for passing invisible light at the surrounding zone of the corresponding lens, so as to form a main lens module comprising the stacked plural main lens elements and surrounded by a plurality of associate lens modules comprising the stacked plural associate lens elements, wherein the main lens module has a main aperture and each of the associate lens modules has an associate aperture, and light data from the outside of the housing enters into the housing and then leaves the housing after passing through the main and associate lens modules.

2. The combined lens module according to claim 1, further comprising an aperture stop, wherein the stacked main lens elements comprise a first main lens element, a second main lens element and a third main lens element, and the aperture stop is deposited between the first main lens element and the second lens element.

3. The combined lens module according to claim 2, wherein the visible light of the light data from the outside of the housing passes through the first main lens element, the aperture stop, the second main lens element and the third main lens element in sequence, and then reaches a sensor outside of the housing, and the optical power of the third main lens element is positive.

4. The combined lens module according to claim 3, wherein the optical powers of the first main lens element and the second main lens element are positive numbers.

5. The combined lens module according to claim 1 further comprising an aperture stop, wherein the stacked main lens elements comprise a first main lens element, a second main lens element and a third main lens element, and the aperture stop is placed between the first main lens element and the housing, and wherein the visible light of the light data from the outside of the housing passes through the aperture stop, the first main lens element, the second main lens element and the third main lens element in sequence, and then reaches a sensor outside of the housing, and the optical power of the third main lens element is positive.

6. The combined lens module according to claim 5, wherein the optical power of the first main lens element is positive, and the optical power of the second main lens element is negative.

7. The combined lens module according to claim 1, wherein the image circle of each of the associate apertures and the image circle of the main aperture are partially or totally overlapped.

8. The combined lens module according to claim 1, wherein the invisible light comprises at least one of infrared light and thermal light.

9. An image capturing-and-sensing assembly comprising:
a housing;
a plurality of lenses deposited within the housing and stacked with one another, each of the lenses comprising a main lens element for passing visible light at the center zone of the corresponding lens and a plurality of associate lens elements for passing invisible light at the surrounding zone of the corresponding lens, so as to form a main lens module comprising the stacked plural main lens elements and surrounded by a plurality of associate lens modules comprising the stacked plural associate lens elements, wherein the main lens module has a main aperture and each of the associate lens modules has an associate aperture; and
a sensor sensing the visible light passing through the main lens module and the invisible light passing through the associate lens modules.

10. The image capturing-and-sensing assembly according to claim 9, wherein the sensor comprises a non-Bayer sensor in which at least one sensing pixel for the invisible light is included in one unit, where the corresponding sensor unit may be in a regular matrix or in an irregular shape.

11. The image capturing-and-sensing assembly according to claim 10, further comprising an aperture stop, and wherein the main lens elements comprise a first main lens element, a second main lens element, and a third main lens element, and wherein the aperture stop is placed between the first main lens element and the second main lens element, or the aperture stop is between the first main lens element or the housing.

12. The image capturing-and-sensing assembly according to claim 11, wherein the optical powers of the first main lens element and the third main lens element are positive numbers.

13. The image capturing-and-sensing assembly according to claim 9, wherein the invisible light comprises at least one of infrared light and thermal light.

14. The image capturing-and-sensing assembly according to claim 9, wherein an image circle of each of the associate apertures and an image circle of the main aperture are partially or totally overlapped.

15. A combined lens module comprising:
a housing; and
a plurality of lenses deposited within the housing and stacked with one another, each of the lenses comprising a main lens element for passing visible light and a plurality of associate lens elements for passing invisible light, so as to form a main lens module comprising the stacked plural main lens elements and a plurality of associate lens modules comprising the stacked plural associate lens elements, wherein
the main lens module has a main aperture and each of the associate lens modules has an associate aperture;
the image circle of each of the associate apertures is smaller than the image circle of the main aperture; and
light data from the outside of the housing enters into the housing and then leaves the housing after passing through the main and associate lens modules.

16. The combined lens module according to claim 15, wherein the image circle of each of the associate apertures and the image circle of the main aperture are partially or totally overlapped, and the image circle of the main aperture is surrounded by the image circles of the associate apertures.

17. A combined lens module comprising:
a housing; and
a plurality of lenses deposited within the housing and stacked with one another, each of the lenses comprising a main lens element for passing visible light and a plurality of associate lens elements for passing invisible light, so as to form a main lens module comprising the stacked plural main lens elements and a plurality of associate lens modules comprising the stacked plural associate lens elements, wherein
the main lens module has a main aperture and each of the associate lens modules has an associate aperture;
the image circle of each of the associate apertures and the image circle of the main aperture are partially or totally overlapped; and
light data from the outside of the housing enters into the housing and then leaves the housing after passing through the main and associate lens modules.

18. The combined lens module according to claim 17, further comprising an aperture stop, and wherein the main lens elements comprise a first main lens element, a second main lens element, and a third main lens element, and wherein the aperture stop is placed between the first main lens element and the second main lens element, or the aperture stop is between the first main lens element or the housing.

* * * * *